UNITED STATES PATENT OFFICE.

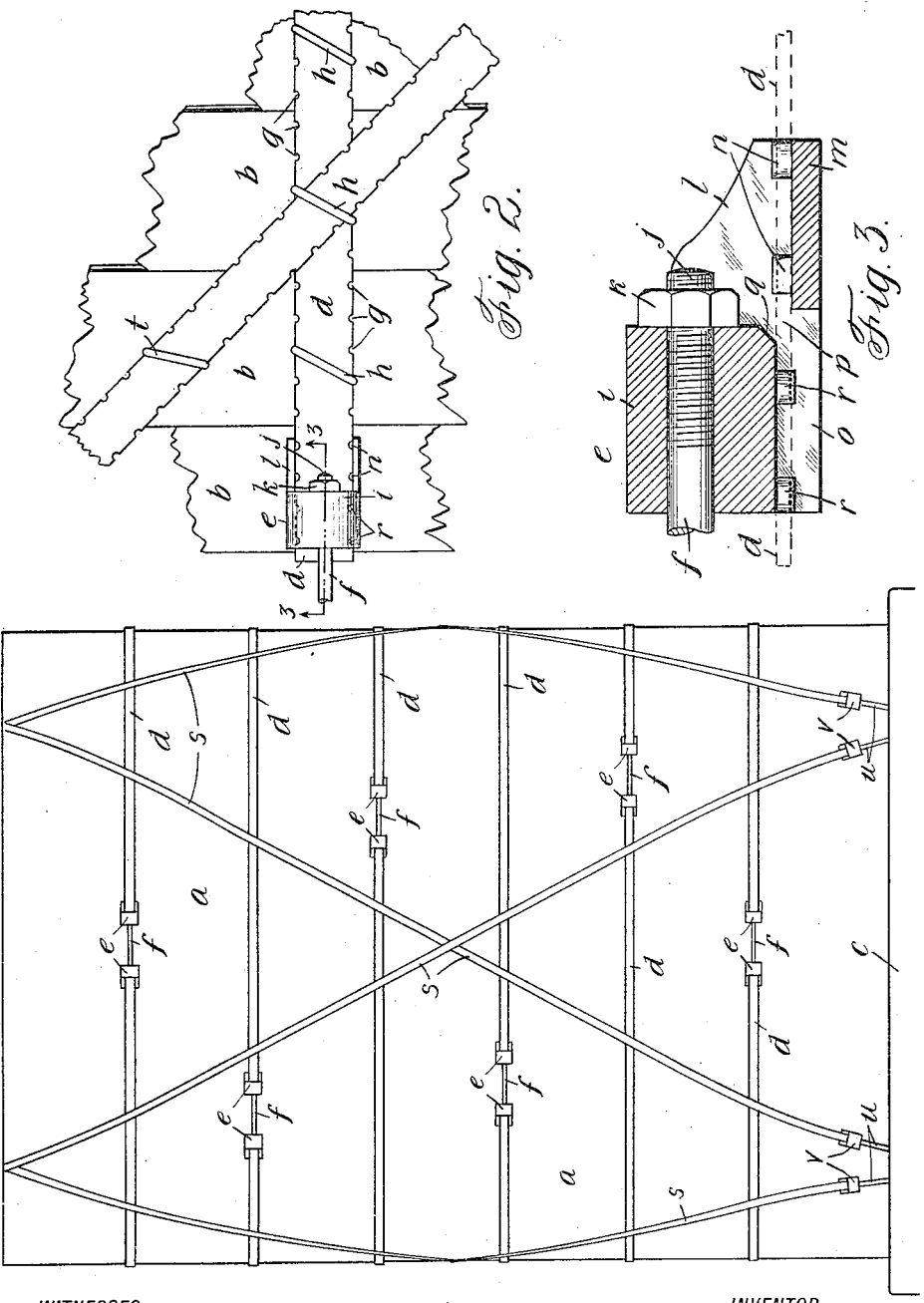

FREDOLIEN J. OBERER, OF PORTLAND, OREGON.

BANDING AND BRACING MEANS FOR STAVE-CONTAINERS.

1,278,728.

Specification of Letters Patent.

Patented Sept. 10, 1918.

Application filed February 21, 1916. Serial No. 79,774.

*To all whom it may concern:*

Be it known that I, FREDOLIEN J. OBERER, a citizen of the United States, and a resident of the city of Portland, county of Multnomah, State of Oregon, have invented a new and useful Improvement in Banding and Bracing Means for Stave-Containers, of which the following is a specification.

My invention relates particularly to stave silos, and the object thereof is to provide improved means for maintaining the silo in an efficient state.

Those experienced in the use of a stave silo know that the staves at the bottom of the silo shrink but very little, because the silage is removed from the bottom of the silo last, and frequently not at all; and, furthermore, the staves draw more or less moisture from the ground. The top of the silo, however, being emptied first, and exposed to the sun and hot winds, will shrink, and where the ordinary means for banding the silo are employed there is a tendency for several staves to cling together, and in so doing causing all the shrinkage to manifest itself at one point, leaving there a large opening. In order to get the silo back into proper shape, it becomes necessary to draw the staves together at the top before filling. Later on the hot moisture from the silage will cause the staves to swell again, and since the hoops or bands do not give, the staves crowded together will be crushed and caused to become narrower at the top each year, so that in two or three years the silo will become much smaller at the top than at the bottom. Silos in this condition have been the cause of more spoiled silage than all other causes, because when a silo in this condition is filled and the silage settles six to eight feet, it will settle away from the wall, causing an air space to form between the wall and the silage, with the result that the silage is only partially formed, or spoiled altogether.

The object of my invention is to provide banding and bracing means by which the staves are restrained to a uniform movement from and toward each other, and in this way assure the closing of all seams due to the shrinkage of the staves.

By my invention each stave is securely fastened to the bands holding the staves together, and in this way each stave is rigidly held in its initial, relative position, so that when the staves shrink there will be no openings larger than the amount of shrinkage that takes place in each stave, which experience shows is never more than about one-eighth of an inch, and which shrinkage is always covered by the tongue and groove joints of the staves. When the staves are so held together it will be unnecessary to draw the silo together at the top before filling, for after the silo has been filled for a few days, the hot moisture from the silage will cause the staves to swell out to their original size, leaving the silo exactly the same in shape as when first erected. Furthermore, my improvement eliminates the necessity for tightening or loosening the bands of the silo several times each year, which work has got to be done from a high ladder, and is both laborious and dangerous and if not done at the proper time may permit the silo to twist out of shape and finally collapse.

The construction and operation of my improved banding and bracing means, and its incidental features are hereinafter fully described, reference being had to the accompanying drawings, in which:

Figure 1 shows, in diagram form, a rear elevation of a stave silo with my improved banding and bracing means applied thereto; Fig. 2 is a larger-scale, fragmental view showing details of the banding and bracing means, and particularly showing how each stave is individually secured to both the banding and bracing elements; and Fig. 3 is a still larger-scale, sectional view taken approximately on the line 3—3 of Fig. 2, and shows the details of one type of convenient means for drawing the ends of the bands together, and also for drawing the lower ends of the diagonal brace to the anchor rod embedded in the concrete foundation.

*a* represents the body of a silo composed of a series of vertical staves *b*, tongue-and-grooved together in the usual manner, as shown in Fig. 2. The silo body is mounted on a concrete foundation *c*. The staves are bound together by bands *d*, encircling the body of the silo at spaced intervals, and the ends of the bands are conveniently fastened together by means of couplings *e*. The latter, as shown in Fig. 3, consists of a body *i* having integral projecting sides *l*, connected at the bottom by a web *m*, which ends some distance from the body, leaving a channel-like opening, *p*, *o*, along the under side of the body $i$, the latter being made with a chamfer at $q$. Lugs $n$ are provided on the web $m$, and similar lugs $r$ on the under side of the body $i$, such lugs being located at the sides $l$ (compare Figs. 2 and 3); and these lugs are adapted to fit in the notches $g$ of the bands $d$, the ends of which are each secured to a coupling $e$; the end of the band being inserted through the opening $p$, $o$ of the coupling, and then arranged as shown in Figs. 2 and 3. The body $i$ of the coupling is made with a longitudinal bore for receiving a tie rod $f$, on the ends $j$ of which are threaded nuts $k$.

When the silo is set up, the bands $d$ and diagonal braces $s$ are arranged on the silo body, as shown in Fig. 1, and the staves are drawn tightly together by the described coupling means. The staves are then individually secured to the bands by means of staples $h$, driven into the staves, the staples being adapted to locate their arms in the notches of the edges of the bands, as shown in Fig. 2. By so doing the staves are held to a uniform movement with respect to each other, both in shrinking and swelling. And, as above mentioned, since the shrinking is, in this way, distributed uniformly throughout the staves, the amount of shrinkage in any one place will never be more than can be taken care of, and covered by the tongue and groove joints, and when the staves later swell out again they will be forced to reassume their original, relative position without crushing any of the staves. In short, when once my silo is set up and banded and braced together by my improved means, the latter will automatically serve to keep the silo in efficient condition.

In order to prevent the twisting of the silo, I use diagonal braces $s$, crossed as shown in Fig. 1. These braces are similar in construction to the bands $d$, and the staves are also individually fastened thereto by staples $t$, as shown in Fig. 2, and in so doing holding the latter against any longitudinal movement upon each other.

The lower ends of the diagonal braces $s$ are secured to anchor rods $u$ firmly embedded in the concrete foundation $c$, said anchor rods being provided with coupling means similar to those described with respect to the coupling $e$.

I claim:

1. In a stave silo, the combination of bands encircling the staves, braces extending diagonally over the staves, said bands being provided with a series of notches along their edges, stave holding members fastened to the staves and bearing in said notches, and means for adjusting the tension of the bands.

2. In a stave silo, the combination of bands encircling the staves, braces extending diagonally over the staves, said bands and said braces being provided with a series of notches along their edges, stave holding members fastened to the staves and bearing in said notches, and means for adjusting the tension of the bands and the braces.

FREDOLIEN J. OBERER.

Copies of this patent may be obtained for five cents each, by addressing the "Commissioner of Patents, Washington, D. C."